Nov. 18, 1941.  A. J. FAUSEK ET AL  2,262,927
VALVE
Filed Jan. 2, 1940

INVENTORS
ARTHUR J. FAUSEK
IRWING F. FAUSEK
BY
ATTORNEY.

Patented Nov. 18, 1941

2,262,927

UNITED STATES PATENT OFFICE 2,262,927

VALVE

Arthur J. Fausek and Irving F. Fausek, Clayton, Mo.

Application January 2, 1940, Serial No. 312,050

2 Claims. (Cl. 284—14)

This invention relates generally to valves and more specifically to valves of the type known as lager valves and adapted for use in association with beer containers for sealing the containers until they are tapped and for excluding dirt and other foreign matter from the beer containers after the contents have been withdrawn therefrom, the predominant object of the invention being to provide a valve of this type which may be formed from sheet metal instead of from castings as was usually the case heretofore.

For many years prior to this invention lager valves have been used which were produced largely from castings, and when lager valves of this construction were employed with wooden beer containers, such as the old style barrels and kegs, they functioned in a highly efficient manner. However, of late years, great numbers of beer containers have been used which are formed of metal, stainless steel, for instance, and it has been found that when lager valves made up of castings which are not formed from stainless steel were used with stainless steel containers, or containers lined with stainless steel, a galvanic action was usually set up which was highly undesirable in that it affected the beer contained in the containers. Also it has been found that when the lager valves were nickleplated the plating was frequently removed from the valve parts by the galvanic action mentioned. To eliminate the production of the troublesome galvanic action mentioned above, attempts were made to produce lager valves from castings made of stainless steel but because of the hardness of this material and for other reasons, the machining operations required to prepare the castings for use as parts of the valves were rendered so expensive as to preclude economical production of the valves.

The main purpose of the present invention, therefore, is to provide a lager valve which may be produced from sheet metal instead of castings as heretofore. By so producing lager valves they may be made of stainless steel, or other desired metal, and no expensive machining operations of the valve parts are required. Also because the lager valves are made from the same material from which the associated containers, or the linings thereof, are made no galvanic action will be set up between the containers, or their linings, and the lager valves when said assembled containers and lager valves are in use.

Figures 5, 6, 7:
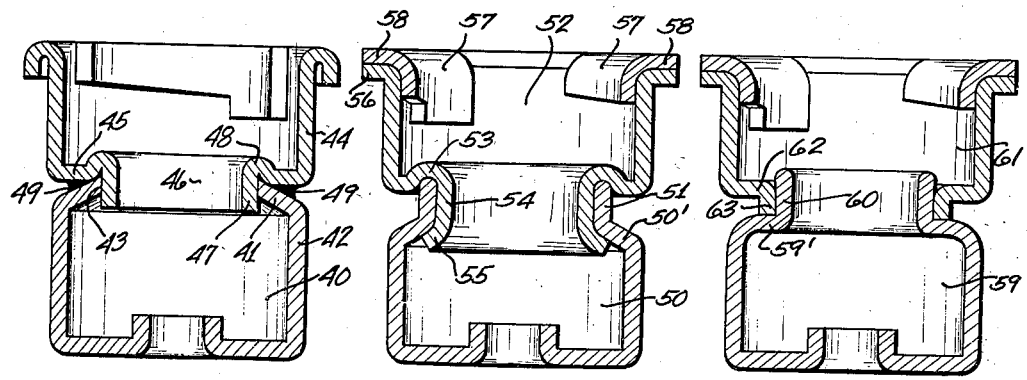

Figs. 5, 6, and 7 are vertical sections illustrating valve bodies constructed in accordance with modified forms of the invention.

In the drawing, wherein are shown for the purpose of illustration, merely, several embodiments of the invention A designates generally, in Figs. 1 to 4, inclusive, one form of the improved valve. The valve A includes a body 1 which is of hollow cylindrical form, said body comprising a lower body section 2 and an upper body section 3. The lower body section 2 of the valve A includes a circumferential wall 4 and a fixed bottom wall 5 which is preferably though not necessarily, formed integral with said circumferential wall 4. Formed through the bottom wall 5 is a centrally located opening 6 which is defined by an upstanding annular flange 6'. At the upper end of the body section 2 the circumferential wall 4 thereof is flared to provide a portion 7 which is of slightly greater diameter than is the lower portion of said body section 2. Additionally the bottom wall 5 has formed therethrough a pair of opposed, arcuate valve apertures 8 which provide passageways through which beer passes, as will hereinafter appear, when the valve in use is in an open condition.

Figure 1:
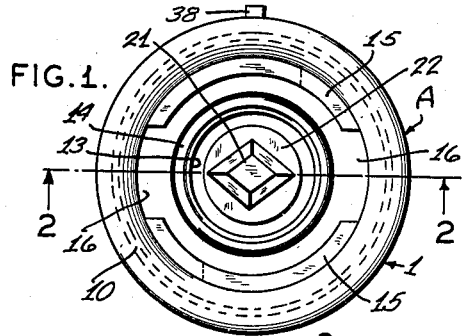
Fig. 1 is a plan view of the improved lager valve.
Figure 2:
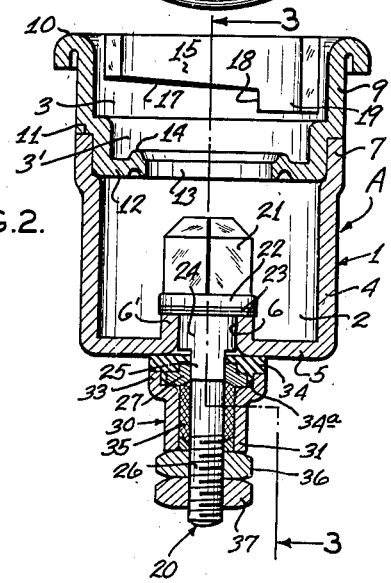
Fig. 2 is a vertical section taken on line 2—2 of Fig. 1.
Figure 3:
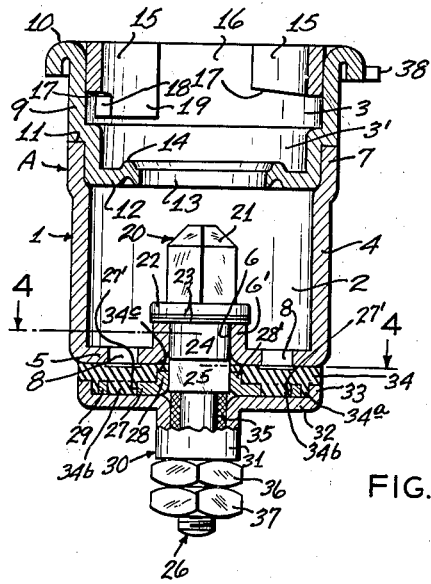
Fig. 3 is a vertical section taken on line 3—3 of Fig. 2.

The upper body section 3 comprises a circumferential wall 9 which preferably, though not necessarily, is turned over or beaded at its top as indicated at 10 in Figs. 1, 2, and 3, to provide said circumferential wall with a suitable top portion. The lower portion 3' of the upper body section 3 is of reduced diameter as shown clearly in Figs. 2 and 3, there being an annular shoulder 11 at the point where the portion of said body section which is of greater diameter meets the portion 3' of said body section which is of reduced diameter. The body section 3 is provided with a bottom wall 12 through which an opening 13 is formed centrally thereof, said bottom wall 12 having formed thereon an upstanding, annular projection 14 which surrounds said opening 13 and provides a valve seat.

The lower body section 2 and the upper body section 3 of the valve body 1 shown in Figs. 1 to 4, inclusive, are assembled to produce a complete, unitary valve body as shown to the best advantage in Figs. 2 and 3; in other words, the lower, reduced portion 3' of the upper body section is introduced into the flared upper portion 7 of the lower body section 2 with the top edge of the circumferential wall of said flared portion 7 of said lower body section in contact with the shoulder 11 of said upper body section. The upper and lower body sections of the valve body 1 are secured together in any suitable manner to provide a rigid, unitary valve body, for instance, these parts may be secured together by welding, or by soldering, or said body sections may be forced together under pressure, or otherwise, to provide a drive fit therebetween, or said body sections may be fixed together in various other ways which would be obvious to one skilled in the art to which the invention relates. The upper and lower valve body sections may be formed in any suitable manner from sheet metal, such, for instance, as with the aid of die means.

Disposed within the upper portion of the upper valve body section 3 is a pair of opposed, arcuately formed elements 15 whose top edges may be arranged substantially flush and parallel relative to the top edge of the upper valve body section 3. The outer faces of the elements 15 are in contact with the inner face of the circumferential wall of the upper body section 3, and said elements are so disposed with respect to each other that passageways 16 (Fig. 1) are provided at opposite sides of the upper body section, and within same, between corresponding ends of said elements 15. Each of the elements 15 is provided with a lower, inclined face which serves as a cam face 17, said cam face extending from one end of the element to a vertical face 18 which is a part of a downwardly projected extension 19 formed on said element 15. The elements 15 are secured to the inner face of the circumferential wall of the upper body section 3 in any suitable manner, such as by welding, soldering, or otherwise.

Associated with the body 1 of the valve A is a valve stem 20 which, at its upper end, is provided with a noncircular head portion 21, said noncircular head portion at its lower end being provided with a flange 22 which contacts with one of a plurality of washers 23 interposed between said flange 22 and the top edge of the annular flange 6' which defines the opening 6 of the bottom wall of the lower body section 2. The portion 24 of the valve stem located immediately below the flange 22 of the head portion 21 of said valve stem, is circular in cross-section and is disposed in the opening 6 of the valve body with its circumferential face contacting with the inner face of the upstanding annular flange 6'. The portion 25 of the valve stem 20 located immediately below the circular portion 24 is provided with opposed, flat faces, as shown in Fig. 4, which gives to this stem section an elongated, noncircular, cross-sectional shape, and the portion 26 of the valve stem located below the portion 25 thereof is circular in cross-section and is externally screw threaded throughout a portion of its length.

Figure 4:
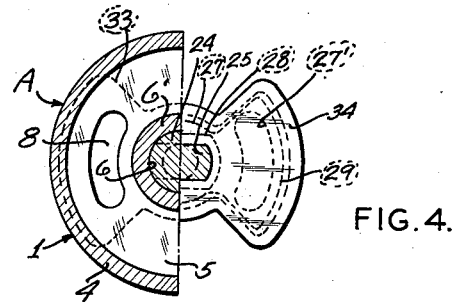
Fig. 4 is a view partly in horizontal section and partly in plan taken on line 4—4 of Fig. 3.

Mounted on the valve stem 20 is a valve head which includes an element 27 shaped as shown to the best advantage in Figs. 2, 3, and 4, said element comprising a central portion 28 from which flared portions 29 extend outwardly in opposite directions. The central portion of the element 27 is provided with a centrally located, noncircular opening, which corresponds in shape and size with the cross-section of the portion 25 of the valve stem, and said portion 25 of the valve stem extends through the noncircular opening of the element 27. The valve head includes also a member 30 which comprises a lower sleeve portion 31, a horizontal wall 32, and a marginal upstanding flange 33. The upper portion of the member 30 corresponds in shape with the element 27 and said element 27 rests on the horizontal wall 32 of said member 30, and is surrounded by the upstanding flange thereof. The valve head structure likewise includes a facing 34, formed of rubber or other suitable material, said facing being arranged as shown to the best advantage in Figs. 2 and 3. In other words the top face of the facing material is arranged in close contact with the lower face of the bottom wall 5 of the valve body 1 and a portion 34a of said facing material is disposed between the outer edge of the element 27 and the inner face of the marginal flange 33 of the member 30. Also portions 34b are extended into apertures 27' of the element 27, and a portion 34c of said facing material overlaps the top edge of the upstanding flange 28' which surrounds the opening formed centrally through the element 27.

The lower sleeve portion 31 surrounds the portion 26 of the valve stem 20 and said sleeve portion is of such diameter relative to the diameter of the stem portion 26 that an annular space is present between the inner face of the sleeve portion and the outer face of the stem portion 26. This annular space receives packing material 35 to which pressure is applied by a gland 36 which is mounted on the stem portion 26, a nut 37 being mounted on the stem portion 26 in contact with the gland 36 in order to prevent unintended rotation of said gland with respect to said stem portion 26.

In the use of the improved lager valve said valve is disposed in an opening formed in a beer container in the usual manner, a projection 38 which is extended from the valve body being extended into a cavity formed in the container so as to prevent rotation of the valve body with respect to the opening of the container. When, in the use of the improved lager valve, it is desired to tap or vent a container with which the valve is associated the appropriate fitting (not shown) is associated with the lager valve by passing a portion of said fitting downwardly into the valve, laterally extended lugs on the fitting passing downwardly through the vertical passageways between corresponding ends of the elements 15, a valve portion of the fitting moving in contact with the valve seat 14, and a noncircular socket portion of the fitting moving into embracing relation with respect to the noncircular head 21 of the valve stem 20 of the valve. The fitting is then rotated in a clockwise direction to rotate the laterally extended lugs of the fitting in contact with and with respect to the cam faces 17 on the elements 15. This rotation of the fitting will force the valve portion of the fitting into tight contact with the valve seat 14 of the valve because of movement of the laterally extended lugs of the fitting in contact with the cam faces 17 of the elements 15, and simultaneously the valve stem 20 of the valve will be rotated to move the portions of the valve head which close the valve apertures 8 of the valve, away from said apertures. When the contents of the container have been withdrawn therefrom the valve may be closed by reversing the direction of rotation of the fitting to move portions of the valve head to positions where they close the valve apertures 8 and to bring the laterally extended lugs of the fitting in line with the vertical passageways 16 of the valve body. The fitting is then moved outwardly relative to the valve body to disengage said fitting from the valve, the laterally extended lugs of the fitting passing through the passageways 16 of the valve body.

In Fig. 5 a slightly different construction of the body of the improved valve is illustrated. In accordance with this form of the invention the lower body section 40 includes a top wall 41 which is inclined upwardly and inwardly from the top portion of the circumferential wall 42 of said lower body section and which has formed therein a centrally located opening 43. The upper body section 44 is provided with a bottom wall 45 in which an opening 46 is formed centrally thereof, said opening being defined by an annular downwardly extended flange 47, and the bottom wall of said upper body section being provided with an upwardly projected bead 48 that provides a valve seat at the junction of the bottom wall 45 of the upper body section and the annular flange 47 thereof. The upper and lower body sections of the structure illustrated in Fig. 5 are assembled as shown in that view and said body sections may be secured together to provide a unitary valve body by welding or soldering as indicated at 49, or in any other suitable manner.

Fig. 6 illustrates a form of the invention which is somewhat similar to the form shown in Fig. 5. However in Fig. 6 the upwardly and inwardly inclined upper wall 50' of the lower body section 50 is provided with an upstanding annular flange 51 which surrounds an opening formed centrally through said upper wall. Also, with respect to the bottom wall of the upper body section 52, a bead 53, which provides a valve seat, is formed therein and this bead embraces the top portion of the annular flange 51 of the lower body section 50. Arranged as an extension, or continuation, of the head 53 is an annular, downwardly extended flange 54 which is extended through the opening in the top portion of the lower body section 50 defined by the annular flange 51. The annular flanges 51 and 54 are in close contact with each other and the lower portion of said flange 54 is flared, as indicated at 55, to secure the body sections 50 and 52 together. In addition to the attachment of the body sections 50 and 52 obtained by flaring the lower portion of the flange 54, said body sections may be additionally secured together to provide a unitary valve body by welding or soldering, or otherwise. The structure of Fig. 6 differs additionally from the structure of Figs. 1 to 4, inclusive, in that an annular flange 56 is provided at the top of the circumferential wall of the upper body section 52, and the elements 57, which correspond to the elements 15 of Figs. 1, 2, and 3, are provided with flanges 58 which overlap the flange 56 of said upper body section. The elements 57 are, of course, suitably secured to the upper body section as has been explained heretofore in the description relating to the structure of Figs. 1 to 4, inclusive.

Still another form of construction of the body of the improved valve disclosed herein is illustrated in Fig. 7. In accordance with this construction the lower body section 59 of the valve body includes a top wall 59' which is provided with a centrally located opening which is defined by an upstanding, annular flange 60 and the top edge of this annular flange provides the valve seat of the improved valve. The upper body section 61 includes a bottom wall 62 which is provided with a centrally located opening defined by a downwardly extended, annular flange 63, said flange 63 being arranged in close, embracing contact with the annular flange 60 of the lower body section 59. The upper and lower body sections are secured together by welding or soldering, or otherwise to provide a unitary valve body.

We claim:

1. A lager valve including a hollow cylindrical valve body comprising a lower cylindrical body section and an upper cylindrical body section assembled to provide a unitary valve body, one of said body sections including a portion which is extended into the other of said body sections with a wall portion of said inserted body portion in close contact with a wall portion of the other body section and said body sections being permanently secured together at the location of said contacting wall portions to provide a unitary valve body, said lower body section being provided with a bottom wall having an opening formed therethrough substantially centrally thereof and being provided with a valve aperture formed therethrough, a seat formed integrally on one body section and disposed within the interior of the valve body, said seat being adapted to receive in contact therewith a fitting adapted for association with the lager valve, a cam face located within said upper body section and adapted to be engaged by a portion of the fitting so as to cam a part of said fitting into operative contacting relation with said seat upon rotation of the fitting with respect to the body of the lager valve, a stem extended through the centrally located opening of the bottom wall of said lower body section, said stem being supported for rotation relative to the valve body and having a portion adapted for engagement with the fitting, and a valve head fixed to and rotatable with said stem in contact with said bottom wall of said lower body section and with respect to the valve aperture therein.

2. A lager valve including a hollow cylindrical valve body comprising a lower cylindrical body section and an upper cylindrical body section assembled to provide a unitary valve body, one of said body sections including a portion which is extended into the other of said body sections with a wall portion of said inserted body portion in close contact with a wall portion of the other body section and said body sections being permanently secured together at the location of said contacting wall portions to provide a unitary valve body, said lower body section being provided with a bottom wall having an opening formed therethrough substantially centrally thereof and being provided with a valve aperture formed therethrough, a seat formed integrally on the inserted body section and disposed within the interior of the valve body, said seat being in the form of a portion extended inwardly from the circumferential wall of said inserted body section and being provided with a raised abutment adapted to receive in contact therewith a fitting adapted for association with the lager valve, a cam face located within said upper body section and adapted to be engaged by a portion of the fitting so as to cam a part of said fitting into operative contacting relation with said abutment upon rotation of the fitting with respect to the body of the lager valve, a stem extended through the centrally located opening of the bottom wall of said lower body section, said stem being supported for rotation relative to the valve body and having a portion adapted for engagement with the fitting, and a valve head fixed to and rotatable with said stem in contact with said bottom wall of said lower body section and with respect to the valve aperture therein.

ARTHUR J. FAUSEK.
IRWING F. FAUSEK.